Figure 1:
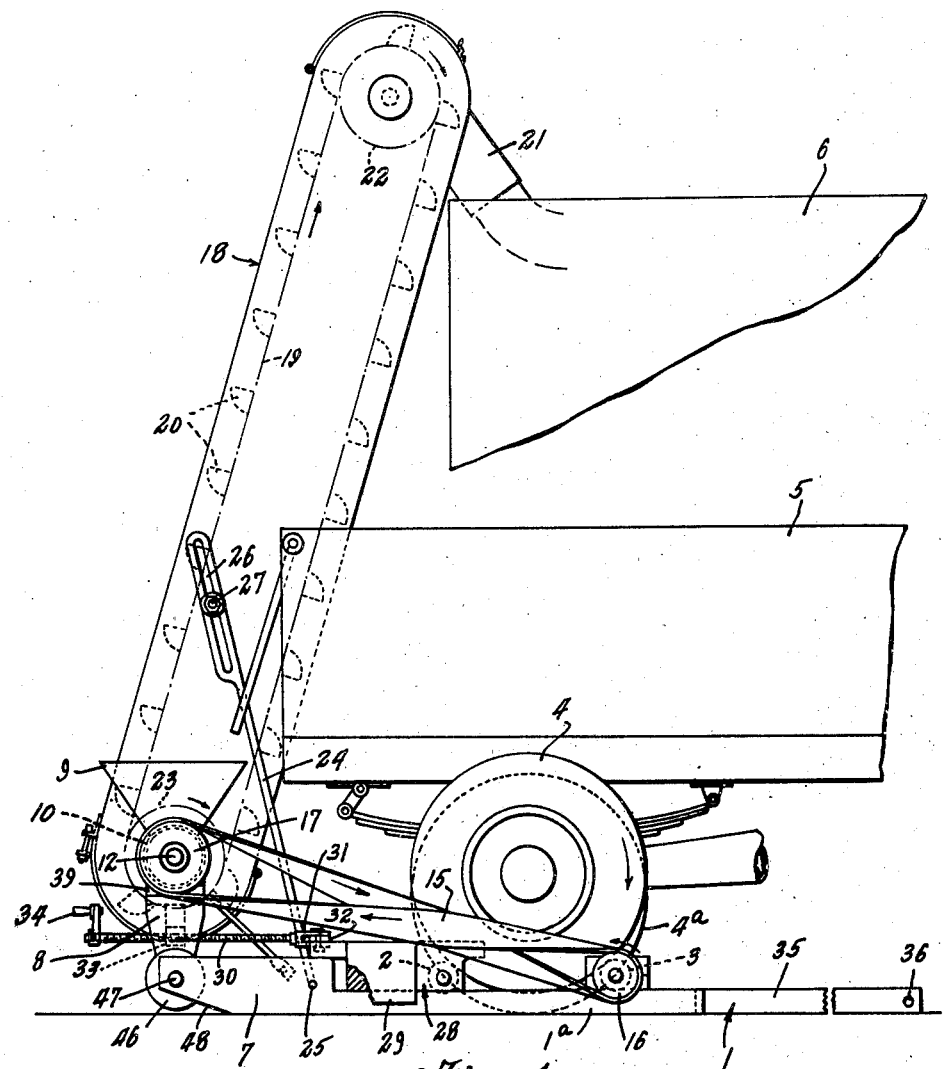

June 4, 1946.  V. GRIBBLE  2,401,633
BIN LOADING APPARATUS
Filed Feb. 14, 1944  2 Sheets-Sheet 1

Virgle Gribble  Inventor

By  Lyon & Lyon
Attorneys

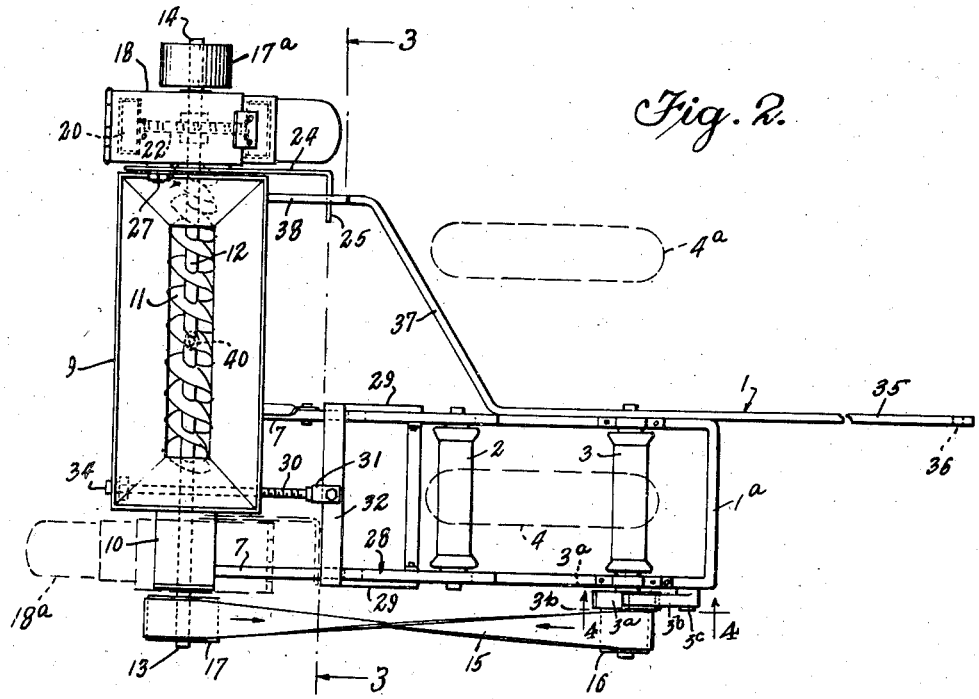
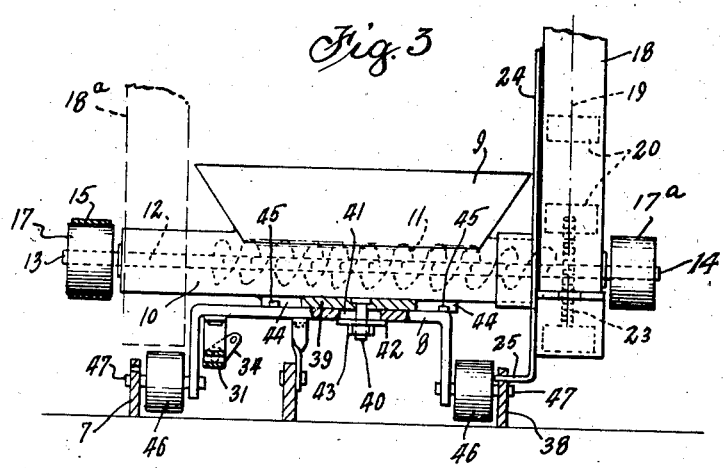
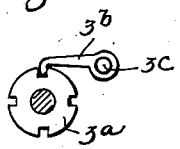

Patented June 4, 1946

2,401,633

UNITED STATES PATENT OFFICE 2,401,633

BIN LOADING APPARATUS

Virgle Gribble, Wilmar, Calif.

Application February 14, 1944, Serial No. 522,261

6 Claims. (Cl. 214—44)

This invention relates to apparatus to facilitate loading from a truck to a point elevated above the truck floor, and while the invention may be adapted to other uses, it is expected to have its greatest usefulness in providing means for loading farm produce, such as wheat, or a similar grain, from a truck body into a bin.

One of the objects of the invention is to provide an apparatus of this kind, which is of simple construction, and which enables the power of the truck to be utilized to effect the elevation of the grain to the point where it falls into the bin.

In accordance with the invention, a construction is provided, which enables one of the driving wheels of the truck to remain in a fixed position while the other wheel drives the elevator that raises the grain to the bin; and one of the objects of the invention is to provide a construction which will enable the same apparatus to load the grain into a bin lying at either side of the truck.

Apparatus for this purpose has been heretofore invented, in which the wheels of the truck carrying the grain, are utilized to drive two rollers from which the power is taken off for driving a transverse horizontal conveyor that delivers to an elevator to raise the grain to the bin. In such apparatus both of the rear driving wheels of the truck have been supported on the rollers. This mode of operation is objectionable because the body of the truck is not rigidly held against lateral movement, and unless the rollers are guarded or especially constructed to prevent it, the wheels and the truck body may travel laterally with the danger that the wheels may suddenly ride off of the rollers. One of the objects of my invention is to overcome this difficulty, and to provide a construction which is simpler, and reduces the length of the rollers, and which, at the same time, will prevent a lateral movement of the truck body when the power of the truck is driving the conveyor and elevator.

A further object of the invention is to provide simple means whereby a driving connection may be readily maintained to the lateral conveyor and elevator, regardless of whether the elevator is located at the right or at the left side of the frame.

A further object of the invention is to provide a simple construction, which will facilitate moving of the apparatus from place to place by connecting it to the rear end of an automobile, or trailer.

Further objects of the invention will appear hereinafter.

The invention consists in the novel parts and combination of parts to be described hereinafter, all of which contribute to produce an efficient bin loading apparatus.

A preferred embodiment of the invention is described in the following specification, while the broad scope of the invention is pointed out in the appended claims.

In the drawings:

Fig. 1 is a side elevation of apparatus embodying my invention, and also illustrating the rear end of a truck in a position to cooperate with and drive the apparatus. This view also shows the upper portion of a bin broken away, to which grain from the truck can be delivered. In this view portions of the frame of the apparatus are broken away near the ground level.

Fig. 2 is a plan of the apparatus illustrated in Fig. 1, but without showing the truck, and merely indicating the position of the truck wheels by dotted outlines. In this view also, the bin is omitted, and dotted lines are employed to indicate the position of the elevator in delivering the grain near the other side of the frame.

Fig. 3 is a vertical section taken about on the line 3—3 of Fig. 2, said parts being broken away and shown in cross-section so as to further disclose details of the construction. In this view the upper portion of the elevator is broken away. Also, in this view, dotted lines are employed to indicate the position of the elevator when the hopper and horizontal conveyor are held in a reversed position to enable the elevator to deliver to a bin on the other side of the frame.

Fig. 4 is a vertical section on the line 4—4 of Fig. 2, but showing only a locking wheel and the locking pawl that cooperates with it.

Referring more particularly to the parts, 1 indicates the frame of the device, which includes a roller frame 1ª (see Figure 2), which is preferably of substantially rectangular form. This roller frame 1ª supports two rollers 2 and 3 that are adapted to support the wheel 4 of the truck 5, carrying grain which is to be raised by means of this apparatus from the floor of the truck to the upper edge of a bin 6, or any other elevated point to which the grain must be raised. The roller frame 1 is intended to lie upon the ground as illustrated in Fig. 1, and is preferably formed of metal bars. Toward their outer ends the side bars of this frame 1ª are enlarged in a vertical direction to form heads 7, and these heads preferably support the cross bar 8, which supports a hopper 9, said hopper including a substantially cylindrical trough 10 below, into which the grain descends when fed into the hopper. Within the trough 10 a feed screw 11 is mounted, and this feed screw is preferably rigid on its shaft 12, said shaft being provided with extensions 13 and 14 at its ends, to facilitate driving the conveyor screw 11 from one or both of the rollers 2 and 3. In the present instance, I prefer to drive the shaft 12 by means of a belt 15 that runs over a belt pulley 16 on the roller 3, which is the roller at the greatest distance from the conveyor. The belt pulley 16 is in line with a similar belt pulley 17 carried on the end 13 of the shaft. In using the apparatus, the grain on the truck can be shoveled into the bin. The direction of rotation of the shaft 12 is such that the horizontal conveyor 11 will move the grain along the trough and into the lower end of a substantially upright conveyor or elevator 18. This elevator may be of any desired construction, but is preferably of the bucket and belt type involving the use of an endless chain or belt 19 carrying buckets 20 that pick up the grain from the bottom of the elevator and raise the same to the upper end of the elevator, where the grain is dumped into a spout 21 that delivers the grain into the bin 6.

The ends of the belt or chain 19 run over pulleys 22 and 23, the latter of which is coaxial with the shaft 12. This enables the upright conveyor or elevator 18 to be rotated on the shaft 12 as an axis, so as to change the inclination of the elevator. The elevator may be held in any adjusted angular position by means of a brace 24, the lower end of which is provided with a laterally projecting finger 25 that is received in a socket or opening in one of the heads 7 (see Figure 1). The upper end of this brace or brace bar 24, is preferably formed with a slot 26 that receives a clamping bolt 27 in the side of the elevator.

In order to adapt the rollers 2 and 3 to cooperate with wheels of different diameters, I prefer to mount the rollers so that they are relatively adjustable toward or from each other. In order to accomplish this, I prefer to support the roller 2 in a bracket 28 including side bars 29 that are guided on the side bars of the roller frame 1ª. This adjusting bracket 28 may be moved longitudinally along the frame 1ª by means of an adjusting screw 30, one end of which is rotatably mounted in a swivel head 31 on a cross bar 32 that forms part of the bracket 28. This feed screw passes through a nut 33 carried by the underside of the cross bar 8, and the end of the feed screw is provided with a crank 34 for rotating the same at will.

In order to enable the wheel 4ª of the truck to rest upon the ground, and at the same time, to complete the frame 1, I provide the frame with a tongue 35 that is secured to one of the side bars of the roller frame 1ª, and which projects at its outer end beyond the frame 1ª, its end being provided with an opening 36 or similar means enabling it to be secured to a draw bar of a truck or to the rear end of an automobile for moving the apparatus from place to place. The rear end of this tongue 35 is formed with a lateral extension 37 located to the rear of the rear wheel 4ª, and terminating in a rear end 38 that extends substantially parallel with the roller frame 1ª. This rear end 38 is formed into a head similar to the head 7, by enlarging the same in a vertical direction. This rear end 38 and the rear ends of the side bars of the roller frame 1ª, support the cross bar 8.

In order to enable the hopper 9 to be moved around into a reversed position so as to place the elevator or upright conveyor 18 at the other side of the frame 1, and so as to deliver in a rearward direction, I prefer to mount the hopper 9 so that it can be rotated on a substantially vertical axis and clamped in the reversed position suggested. For this purpose the hopper is preferably formed with a base plate 39 carrying a pivot bolt 40 that extends down through an opening or slot 41 in the cross bar 8, and provided with a washer plate 42 and clamping nut 43. This base plate or sole plate 39 and the cross bar 8, are preferably provided with interlocking means for preventing accidental rotation on the axis of the clamping bolt 40. For this purpose the plate 39 may be provided with a pair of diametrically opposite slots 44 that receive lugs 45 projecting up from the upper face of the cross bar 8. With this construction, it is evident that by loosening the nut 43, the hopper 9 can be swung around into a reversed position with respect to the frame.

The hopper is preferably located so that it lies about opposite to the rear end of the truck and in a convenient position to enable grain on the truck floor to be shoveled into the hopper. On this account, it will be noted that one end of the hopper lies about in line with the driving wheel 4 and the rollers 2 and 3, while the other end of the hopper projects a considerable distance beyond the inner side of the roller frame 1ª.

When the hopper and elevator are in their reversed position, the elevator will be located on the other side of the frame as indicated by the dotted lines 18ª in Figure 2.

If the feed screw or worm 11 is a left-hand worm as illustrated in Fig. 2, the belt 15 should be a crossed belt as indicated in Fig. 2. However, if the upright conveyor or elevator 18 is located in its reversed position as indicated at 18ª, the belt 15 will be applied as an open belt; and when the upright conveyor is in this left-hand position, the pulley 17ª is employed on the end 14 of the shaft 12 to drive the screw conveyor 11. It will be evident that if desired, the same pulley 17 can be used at either end of the shaft by making the same disconnectible.

In order to facilitate moving the apparatus from place to place, I prefer to provide the rear ends of the frame bars that form the frame 1, with a pair of rollers 46, the shafts 47 of which are elevated so that these rollers are held out of contact with the ground when the frame 1 is lying flat upon the ground.

However, if the forward end of the tongue 35 is raised to hitch the same to a tractor, or the rear end of an automobile or truck, these rollers will rest upon the ground. This is evident from an inspection of Fig. 1, which indicates the rear ends of the bars that form this frame, as being cut away on an inclined line 48. Cutting the bars away in this manner, gives more clearance, and facilitates the rollers descending onto the ground.

In order to enable the car to be driven off the rollers 2 and 3 on its own power, it is advisable to provide means to enable the roller 3 to be held against rotation (see Figs. 2 and 4). For this purpose I may provide the shaft of the roller 3 with a lock wheel 3ª, having a lock pawl 3ᵇ that can be set when desired. This pawl is mounted on a stud 3ᶜ. This locking means is omitted in Fig. 1 for the sake of clearness.

In using the apparatus, the truck to be unloaded, would be backed onto the frame so that the drive wheel 4 of the truck would rest on the rollers 2 and 3. The grain or other produce on the floor of the truck, would be shoveled into the hopper 9. The gear shifts (not illustrated) of the truck, would then be operated to put the truck in gear so as to drive the rear wheels through the usual differential on the back axle of the truck. The wheel 4a, of course, would be kept from rotating by the ground, while the wheel 4 would rotate and drive the belt 15, thereby driving the screw conveyor 11 in the proper direction to push the grain from the trough into the lower end of the upright conveyor or elevator 18. This would drive the elevator in the proper direction to dump the grain into the delivery spout 21. The wheel 4a that rests on the ground, holds the body of the truck fixed and prevents any possibility of the truck running off the rollers.

If it is necessary or more convenient to have the elevator 18 deliver the grain in the opposite direction and on the opposite side of the frame 1, this can be accomplished by loosening the nut 43 and rotating the hopper and elevator 18 around to a reversed position, in which the elevator will occupy the position 18a as illustrated in Fig. 2.

In practice, a flexible tube (not illustrated) would be carried on the end of the spout 21.

Many other embodiments of this invention may be resorted to without departing from the spirit of the invention.

What I claim is:

1. In a loading apparatus for loading material from a motor truck to an elevated point above a bin, the combination of a frame to be supported upon the ground adjacent the bin, said frame including a roller frame with a pair of rollers carried therein adjacent the ground to receive one of the driving wheels of the truck while the other wheel of the truck rests in a fixed position on the ground, a transversely disposed hopper in a position to receive material from the rear end of the truck, a lower conveyor in the hopper, means for driving the same from one of the rollers, said hopper having one end adjacent the roller frame and having its other end extending laterally from the roller frame, the first-named frame also including a forwardly extending tongue attached to the inner side of the said roller frame and having a lateral extension extending back of the position of the truck wheel that rests on the ground, and attached to the hopper to support the same, a conveyor associated with the hopper, and a substantially upright conveyor means for receiving material from the first-named conveyor and for delivering the same into the bin.

2. In a loading apparatus for loading material from a motor truck to an elevated point above a bin, the combination of a frame to be supported upon the ground adjacent the bin, said frame including a roller frame with a pair of rollers carried therein adjacent the ground to receive one of the driving wheels of the truck while the other wheel of the truck rests in a fixed position on the ground, a transversely disposed hopper in a position to receive material from the rear end of the truck, a lower conveyor in the hopper, means for driving the same from one of the rollers, said hopper having one end adjacent the roller frame and having its other end extending laterally from the roller frame, the first-named frame also including a forwardly extending tongue attached to the inner side of the said roller frame and having a lateral extension extending back of the position of the truck wheel that rests on the ground, and attached to the hopper to support the same, a conveyor associated with the hopper, a substantially upright conveyor means for receiving material from the first-named conveyor supported on the frame for receiving material from the first-named conveyor, and for delivering the same into the bin, and a pair of trundle rollers supported on the end of the frame adjacent the hopper, with their shafts elevated on the frame so that when the frame is lying flat upon the ground the trundle rollers are supported above the ground, and so that when the tongue is elevated at its end remote from the hopper, the trundle rollers will rest on the ground and operate as a wheeled support for the rear end of the loading apparatus in dragging the same like a trailer from place to place.

3. In a loading apparatus for loading material from a motor truck to an elevated point above a bin, the combination of a frame to be supported upon the ground adjacent the bin, a pair of rollers carried by said frame adjacent the ground to receive one of the driving wheels of the truck while the other wheel of the truck rests in a fixed position on the ground, a transversely disposed hopper mounted on a frame to rotate on a substantially vertical axis and capable of assuming two positions in which it can receive material from the rear end of the truck, a lower conveyor associated with the hopper and a substantially upright conveyor means supported on the hopper so that it is capable of being swung with the hopper into a reverse position toward the other side of the frame, and means for driving the lower conveyor from one of the rollers in either of the positions that the hopper may assume.

4. In a loading apparatus for loading material from a motor truck to an elevated point above a bin, the combination of a frame to be supported upon the ground adjacent the bin, a pair of rollers carried by said frame adjacent the ground to receive one of the driving wheels of the truck while the other wheel of the truck rests in a fixed position on the ground, a transversely disposed hopper mounted on a frame to rotate on a substantially vertical axis and capable of assuming two positions in which it can receive material from the rear end of the truck, a lower conveyor associated with the hopper and a substantially upright conveyor means supported on the hopper so that it is capable of being swung with the hopper into a reverse position toward the other side of the frame, and means for driving the lower conveyor from one of the rollers in either of the positions that the hopper may assume, said upright conveyor mounted to swing on a substantially horizontal axis to enable its inclination to be adjusted, and a movable brace connecting the same with the frame and capable of being attached to the frame and upright conveyor in either of the said positions that the hopper may assume.

5. In a loading apparatus for loading material from a motor truck to an elevated point above a bin, the combination of a frame to be supported upon the ground adjacent the bin, said frame including a roller frame with a pair of rollers carried thereby adjacent the ground to receive one of the driving wheels of the truck while the other wheel of the truck rests in a fixed position, a transversely disposed hopper including a conveyor trough and a screw conveyor at the bottom thereof to receive material from the rear end of the truck, a substantially upright conveyor means for receiving the material from the screw conveyor, and supported on the hopper at one side of the frame, a support for the hopper, a connecting means between said hopper and said support to render said hopper and said conveyor capable of being swung around on said support into a reverse position to hold the substantially upright conveyor at the other side of the frame, and means for driving the screw conveyor from one of said rollers in either position of the hopper in a direction to advance material from the hopper into the upright conveyor.

6. In a loading apparatus for loading material from a motor truck to an elevated point above a bin, the combination of a frame to be supported upon the ground adjacent the bin, said frame including a roller frame with a pair of rollers carried thereby adjacent the ground to receive one of the driving wheels of the truck while the other wheel of the truck rests in a fixed position, a transversely disposed hopper including a conveyor trough and a screw conveyor at the bottom thereof to receive material from the rear end of the truck, a substantially upright conveyor means for receiving the material from the screw conveyor, and supported on the hopper at one side of the frame, a support for the hopper, a connecting means between said support and said hopper rendering said hopper and said conveyor capable of being swung around on said support into a reverse position to hold the substantially upright conveyor at the other side of the frame, said screw conveyor having a shaft projecting at each end beyond the ends of the hopper, a belt pulley rigid with one of said rollers, a pulley for the ends of said shaft to align with the pulley of the roller to enable a belt to be employed in either position of the hopper to drive the screw conveyor.

VIRGLE GRIBBLE.